US008852548B2

(12) United States Patent
Kim et al.

(10) Patent No.: US 8,852,548 B2
(45) Date of Patent: Oct. 7, 2014

(54) METHOD OF PREPARING HIGH CRYSTALLINE NANOPOROUS TITANIUM DIOXIDE AT ROOM TEMPERATURE

(75) Inventors: Hae-Jin Kim, Daejeon (KR); Jou-Hahn Lee, Daejeon (KR); Soon-Chang Lee, Daejeon (KR); Hyun-Uk Lee, Chungcheongbuk-do (KR); Won-Ki Hong, Daejeon (KR); Hye-Ran Kim, Daejeon (KR); Jung-Hye Seo, Chungcheongnam-do (KR)

(73) Assignee: Korea Basic Science Institute, Yuseong-Gu (KR)

( * ) Notice: Subject to any disclaimer, the term of this patent is extended or adjusted under 35 U.S.C. 154(b) by 127 days.

(21) Appl. No.: 13/409,065

(22) Filed: Feb. 29, 2012

(65) Prior Publication Data
US 2013/0079219 A1    Mar. 28, 2013

(30) Foreign Application Priority Data

Sep. 26, 2011   (KR) .................. 10-2011-0096979

(51) Int. Cl.

| | | |
|---|---|---|
| C01G 23/047 | (2006.01) | |
| C01G 23/053 | (2006.01) | |
| B01J 21/06 | (2006.01) | |
| B01J 35/10 | (2006.01) | |
| B82Y 40/00 | (2011.01) | |
| B01J 37/34 | (2006.01) | |
| B01J 35/00 | (2006.01) | |
| B01J 37/03 | (2006.01) | |
| B01J 37/06 | (2006.01) | |
| B01J 37/00 | (2006.01) | |

(52) U.S. Cl.
CPC ........... *C01G 23/053* (2013.01); *C01P 2002/72* (2013.01); *B01J 21/063* (2013.01); *B01J 35/1061* (2013.01); *B82Y 40/00* (2013.01); *B01J 37/343* (2013.01); *B01J 35/004* (2013.01); *C01P 2004/03* (2013.01); *B01J 37/033* (2013.01); *B01J 37/06* (2013.01); *B01J 35/002* (2013.01); *C01P 2004/64* (2013.01); *B01J 35/0013* (2013.01); *B01J 37/0018* (2013.01); *B01J 35/1019* (2013.01); *C01P 2004/04* (2013.01); *C01P 2006/16* (2013.01); *B01J 37/036* (2013.01); *B01J 35/1023* (2013.01); *B01J 35/1057* (2013.01)
USPC .......................................... 423/610; 502/350

(58) Field of Classification Search
USPC .......................................... 423/610; 502/350
See application file for complete search history.

(56) References Cited

FOREIGN PATENT DOCUMENTS

| KR | 10-0836771 B1 | 6/2008 |
|---|---|---|
| KR | 2011-0011973 A | 2/2011 |

OTHER PUBLICATIONS

Yu et al., Preparation of highly photocatalytic active nano-sized TiO2 particles via ultrasonic irradiation, 2001, Chemcomm Communication, 1942-1943.*

(Continued)

*Primary Examiner* — Kaj K Olsen
*Assistant Examiner* — Pritesh Darji
(74) *Attorney, Agent, or Firm* — Christie, Parker & Hale, LLP

(57) ABSTRACT

Disclosed is a method of preparing high crystalline nanoporous titanium dioxide, in which the high crystalline nanoporous titanium dioxide, which is harmless to the human body and self-purified through the decomposition of organic matters, is prepared in mass production at the room temperature through a simply synthesis method. The method includes the steps of (a) mixing a titanium precursor and a surfactant in a solvent and performing a sol-gel reaction at a room temperature; (b) maturing a reactant obtained through the sol-gel reaction at the room temperature; (c) filtering the matured reactant and washing the matured reactant; and (d) drying the washed reactant to obtain titanium dioxide having nanopores.

8 Claims, 8 Drawing Sheets

(56) References Cited

OTHER PUBLICATIONS

Xie et al., Photoelectrochemical behavior of titania nanotube array grown on nanocrystalline titanium, J Mater Sci (2009) 44:2907-2915.*

Atanu Mitra et al., Synthesis and characterization of mesoporous titanium dioxide using self-assembly of sodium dodecyl sulfate and benzyl alcohol systems as templates, Department of Materials Science and Centre for Advanced Materials, Indian Association for the Cultivation of Science, Jadarpur, Kolkata 700 032, India; Science Direct, 2008, pp. 66-72.

* cited by examiner

METHOD OF PREPARING HIGH CRYSTALLINE NANOPOROUS TITANIUM DIOXIDE AT ROOM TEMPERATURE

CROSS-REFERENCE TO RELATED APPLICATION

This application claims the benefit under 35 U.S.A. §119 of Korean Patent Application No. 10-2011-0096979, filed on Sep. 26, 2011 in the Korean Intellectual Property Office, the entirety of which is incorporated herein by reference.

BACKGROUND OF THE INVENTION

1. Field of the Invention

The present invention relates to a technology for preparing high crystalline nanoporous titanium dioxide. More particularly, the present invention relates to a method of preparing high crystalline nanoporous titanium dioxide ($TiO_2$), in which the high crystalline nanoporous titanium dioxide ($TiO_2$), which is harmless to the human body and self-purified through the decomposition of organic matters, can be prepared in mass production at the room temperature through a simply synthesis method.

2. Description of the Related Art

A photocatalyst refers to a catalyst activated by light energy. Since the photocatalyst represents the activity and reaction mechanism in the normal temperature, the photocatalyst is distinguished from the general catalyst and can be used in a simple and small-size reactor. When light having a predetermined wavelength is irradiated onto semiconductor oxide, such as $TiO_2$, electrons ($e^-$) excited by the light migrate to a conduction band and holes ($h^+$) are created and migrate to a surface of the $TiO_2$. The holes may react with $H_2O$ or $OH^-$ on the surface of the $TiO_2$, so that OH radicals are generated, and the OH radicals decompose the organic matters adhering to the surface of the $TiO_2$ by oxidizing the organic matters. The $TiO_2$ has bandgap energy of about 3.2 eV and it is generally known in the art that light having energy higher than the bandgap energy of the $TiO_2$ among solar lights has the wavelength of 380 nm or below.

The photocatalyst has been extensively used as an environmental material to remove trace organic matters and bad smells, to restrict carcinogenic substances, to treat waste water or to remove Sox and NOx, and used in the energy field to prepare hydrogen fuel by dissolving water. In addition, the photocatalyst has great potential energy in applications thereof. For instance, the photocatalyst can be used to convert harmful components into useful components as well as to decompose harmful substances.

Representative examples of the photocatalyst are $TiO_2$, $SnO_2$, $Fe_2O_3$, $WO_3$, ZnO and CdS. Although various oxides can be used as the photocatalyst, ZnO and CdS are disadvantageous in that they generate harmful Zn and Cd as they are decomposed by the light. In addition, $WO_3$ represents the superior efficiency as the photocatalyst only for specific materials and $SnO_2$ and $Fe_2O_3$ represent the low efficiency when they are used as the photocatalyst.

Among the above materials, $TiO_2$ may not be changed even if the light is irradiated thereto, so the $TiO_2$ can be semi-permanently used. In addition, the $TiO_2$ can decompose any organic matters into $CO_2$ and $H_2O$ by oxidizing the organic matters, so the $TiO_2$ has been spotlighted as the photocatalyst.

The $TiO_2$ has three crystalline phases of rutile, anatase and brookite under the normal pressure and can be transited from the brookite and the anatase phases, which are metastable phases, to the rutile phase as the temperature is increased. The brookite and the anatase having the tetragonal structures and the brookite having the orthorhombic structure are based on the $TiO_6$ octahedral structure mainly consisting of Ti, in which the rutile shares two edges, the anatase shares four edges and the brookite shares three edges.

The rutile includes two unit cells, the anatase includes four unit cells and the brookite includes eight unit cells.

The $TiO_6$ octahedral structure serving as the basic structure is tilted from the regular octahedral structure and the tilting degree may increase in the order of the rutile, the anatase and the brookite. When determining according to the Pauling' law, the rutile is the most stable structure in terms of energy. The anatase and the brookite have the metastable structures, which can be transited into the stable structures through the high-temperature treatment. When analyzing based on the energy band concept, the anatase and the rutile have the 3.2 eV and 3.0 eV, respectively. Therefore, when comparing with the anatase, the rutile can absorb light having the wider ultraviolet band, so it is expected that the light source employing the rutile may represent the superior light efficiency than the light source employing the anatase. However, the anatase represents the superior performance in practice.

As a cited reference of the present invention, Korean Unexamined Patent Publication No. 10-2011-0011973 discloses a method of preparing TiO2 and a method of fabricating a dye-sensitized solar cell by using the same.

SUMMARY OF THE INVENTION

An object of the present invention is to provide a method of preparing high crystalline nanoporous titanium dioxide ($TiO_2$), which can be prepared at the room temperature and can represent the superior water purifying performance through the photocatalytic phenomenon.

In order to accomplish the above object, there is provided a method of preparing high crystalline nanoporous titanium dioxide at a room temperature, which includes the steps of (a) mixing a titanium precursor and a surfactant in a solvent and performing a sol-gel reaction at a room temperature; (b) maturing a reactant obtained through the sol-gel reaction at the room temperature; (c) filtering the matured reactant and washing the matured reactant; and (d) drying the washed reactant to obtain titanium dioxide having nanopores.

According to the method of preparing high crystalline nanoporous $TiO_2$ of the present invention, the high crystalline nanoporous $TiO_2$ can be prepared in mass production at the room temperature through a simply synthesis method by using the surfactant, so the product yield can be significantly improved.

In addition, the high crystalline nanoporous $TiO_2$ prepared by the method according to the present invention has the superior photocatalytic characteristic as compared with P25 $TiO_2$, which has been commercially used, in terms of the self-purifying function for the organic matters.

Therefore, since high crystalline nanoporous $TiO_2$ particles prepared by the method according to the present invention have the superior photocatalytic characteristic, the high crystalline nanoporous $TiO_2$ particles are suitable for articles used in a daily life, such as air-purifying products or antibiotic-virus filters, and can be used for memory devices, logic devices, dye-sensitized solar cells, gas sensors, biosensors, and flexible devices.

In addition, since the high crystalline nanoporous $TiO_2$ prepared by the method according to the present invention has the superior self-purifying function for the organic matters, the high crystalline nanoporous TiO$_2$ can be applied in the field of green energy, such as solar cells, hydrogen energy and water purification.

DETAILED DESCRIPTION OF THE INVENTION

Figure 1:
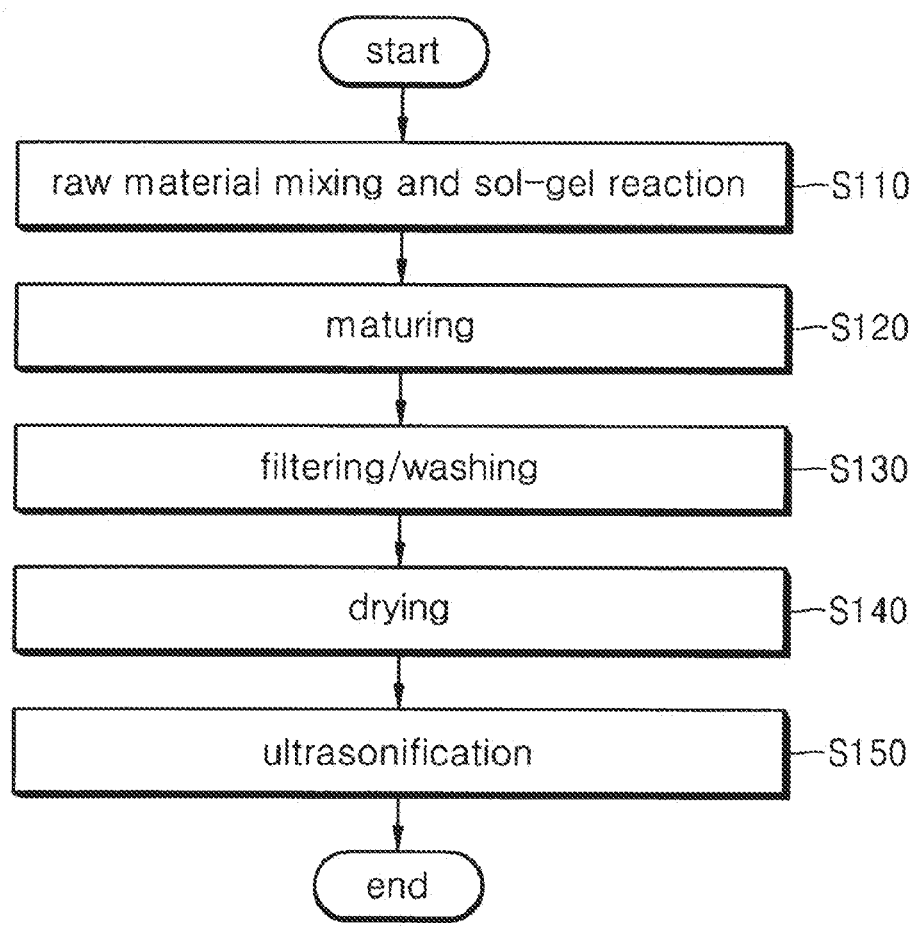
FIG. 1 is a flowchart showing a method of preparing high crystalline nanoporous TiO$_2$ according to one embodiment of the present invention.

Advantages and/or characteristics of the present invention, and methods to accomplish them will be apparently comprehended by those skilled in the art when making reference to embodiments in the following description and accompanying drawings. However, the present invention is not limited to the following embodiments, but various modifications may be realized. The present embodiments are provided to make the disclosure of the present invention perfect and to make those skilled in the art perfectly comprehend the scope of the present invention. The present invention is defined only within the scope of claims. The same reference numerals will be used to refer to the same elements throughout the specification.

Hereinafter, a method of preparing high crystalline nanoporous titanium dioxide (TiO$_2$), which can be prepared at the room temperature, according to the exemplary embodiments of the present invention will be described in detail with reference to accompanying drawings.

Preparation Method of High Crystalline Nanoporous TiO$_2$

FIG. 1 is a flowchart showing a method of preparing high crystalline nanoporous TiO$_2$ according to one embodiment of the present invention.

Referring to FIG. 1, the method of preparing the high crystalline nanoporous TiO$_2$ includes a raw material mixing and sol-gel reaction step (S110), a maturing step (S120), a filtering/washing step (S130) and a drying step (S140). In addition, the method of preparing the high crystalline nanoporous TiO$_2$ may further include an ultrasonification step S150.

Raw Material Mixing and Sol-Gel Reaction

In raw material mixing and sol-gel reaction step (S110), a Ti precursor and a surfactant are mixed in a solvent for the sol-gel reaction at the room temperature. The solvent may include water or alcohol. The room temperature may vary depending on the use environment. For instance, the room temperature is in the range of 1° C. to 40° C.

According to the sol-gel reaction, metal alkoxide is transited into the sol state through the hydrolysis and condensation, and then a predetermined time has elapsed for perfect condensation so that the sol state is transited into the gel state, which cannot be networked anymore.

The Ti precursor may be selected from titanium n-butoxide and titanium isopropoxide.

The surfactant may be a cation surfactant.

The cation surfactant may include cetyltrimethyl ammonium bromide satisfying following chemical formula 1 or cetyltrimethyl ammonium chloride satisfying following chemical formula 2.

| $CH_3(CH_2)nN^+(CH_3)_3Br^-$ | Chemical formula 1 |
|---|---|
| $CH_3(CH_2)nN^+(CH_3)_3Cl^-$ | Chemical formula 2 |

Preferably, n is 1 to 20 in chemical formulas 1 and 2. If n exceeds 20, a length of hydrophobic tail is too long, so the surfactant may not be readily dissolved in the solvent.

In raw material mixing and sol-gel reaction step (S110), preferably, the Ti precursor and the surfactant are input into a reaction bath filled with the solvent in the molar ratio of 3:0.05 to 3:1, and then mixed by a mechanical stirrer such that they are uniformly distributed. If the molar ratio of the Ti precursor and the surfactant is less than 3:0.05, the amount of the surfactant is too low to form the nanopores. In contrast, if the molar ratio of the Ti precursor and the surfactant exceeds 3:1, the manufacturing cost may be increased without the additional effect of the surfactant.

The surfactant having the molarity of 0.05M to 2M is preferably used. If the molarity of the surfactant is less than 0.05M, the molarity is too low to form the nanopores. In contrast, if the molarity of the surfactant exceeds 2M, the manufacturing cost may be increased without the additional effect of the surfactant.

Maturing

In maturing step (S120), the reactant subject to the sol-gel reaction is matured for 12 hours to 30 hours at the room temperature. The room temperature may vary depending on the use environment. For instance, the room temperature is in the range of 1° C. to 40° C.

If the maturing time is less than 12 hours, the maturing effect is insufficient. In contrast, if the maturing time exceeds 30 hours, the crystallinity may be improved, but the productivity may be lowered due to the excessive maturing time.

Filtering/Washing

In filtering/washing step (S130), the matured reactant is filtered and washed. At this time, TiO$_2$ sediments, which are created through the sol-gel reaction and maturing steps, are filtered under the reduced pressure and then washed by using distilled water. Preferably, the washing may repeat at least three times.

Drying

In drying step (S140), the washed reactant is dried to obtain nanoporous TiO$_2$. Preferably, the drying step is performed for 2 hours to 12 hours at the temperature of 10° C. to 40° C. If the drying temperature is less than 10° C. or the drying time is less than 2 hours, the crystallinity of the reactant may be degraded. In contrast, if the drying temperature exceeds 40° C. or the drying time exceeds 12 hours, the crystallinity of the reactant may be improved, but the specific surface area may be reduced.

Ultrasonification

In ultrasonification step (S150), the $TiO_2$ obtained through the drying step (S140) is mixed with distilled water and the ultrasound is applied to the mixed solution. At this time, the ultrasound may be applied through the scanning scheme by dipping an ultrasonic horn in the reaction bath filled with the mixed solution.

In the case of $TiO_2$ having wormhole-like pores formed through the sol-gel reaction, nanopores have the amorphous framework, so the ultrasonification is performed to improve the crystallinity for the nanopores having the amorphous framework.

If the ultrasonification is performed, the nanopores having the amorphous framework may be gradually changed into the nanopores having the crystalline framework. In detail, when the mixed solution filled in the reaction bath, that is, the reactant is bubble-collapsed through the ultrasonification, the reactant is subject to the extreme conditions, such as the local temperature of 5000K, the local pressure of 1000 bar, and the heating/cooling ratio of $10^{10}$K/s. For this reason, the crystallinity of the reactant may be improved and the chemical reactivity may be significantly increased on the reactant surface.

In more detail, in raw material mixing and sol-gel reaction step (S110), the surfactant is self-assembled in the aqueous solution, so that micelles are formed. The micelles are bonded with titanium species of $TiO_2$ while forming the cooperative assembly, so that the nanopores can be formed. The wormhole-like pores having the amorphous framework may have the high crystallinity by performing the ultrasonification in such a manner that the reactant is subject to the extreme conditions, such as the high local temperature, the high local pressure and the heating/cooling ratio.

Preferably, the ultrasonification is performed by applying the high-intensity ultrasound having the energy level of 15 KHz to 30 KHz and 90 W to 110 W for 10 minutes or more.

If the output voltage is low or process time is short in the ultrasonification, the specific surface area may be remarkably increased, but the crystallinity may not be sufficiently improved. For instance, the specific surface area of the reactant is about 700 $m^2$/g before the ultrasonification. This specific surface area of the reactant is reduced to about 600 $m^2$/g if the ultrasonification is performed for 10 minutes and is reduced to about 400 $m^2$/g if the ultrasonification is performed for 40 minutes.

Nevertheless, the output voltage and the process time of the ultrasonification are set to the above range because the crystallinity and the specific surface area of the reactant may be harmoniously established only when the ultrasonification is performed with the appropriate output voltage and appropriate treatment time.

The ultrasonification is performed for 10 minutes or more because the diffraction peak of the anatase phase of the $TiO_2$ may be generated when the ultrasonification is performed for 10 minutes and the crystallinity is continuously increased after 10 minutes has elapsed in the ultrasonification.

At this time, as disclosed in the present invention, if the high-intensity ultrasound is applied, the $TiO_2$ not only has the anatase phase, but also has the bicrystalline phase including anatase and brookite, and the bicrystalline phase represents the superior photolysis effect.

The high crystalline nanoporous $TiO_2$ according to the embodiment of the present invention can be prepared through the above steps.

The high crystalline nanoporous $TiO_2$ prepared through the above steps (S110 to S150) has the wormhole-like pores having the mean diameter of 1 nm to 3 nm. As a result, the high crystalline nanoporous $TiO_2$ prepared through the method according to the present invention may represent superior organic matter photolysis effect due to the wormhole-like pores.

Embodiments

Hereinafter, the structure and operation of the present invention will be described in detail with reference to the exemplary embodiments of the present invention. The following exemplary embodiments are illustrative purpose only and the present invention is not limited thereto.

Description about known functions and structures, which can be anticipated by those skilled in the art, will be omitted.

1. Specimen Preparation

Embodiment 1

Titanium n-butoxide (97%) available from Aldrich company was used as a titanium precursor and cetyltrimethyl ammonium bromide (CTAB) available from Aldrich company was used as a surfactant.

First, the solution of the titanium n-butoxide and the CTAB having the carbon number of 11 in the carbon chain (M ratio=2:0.5) was stirred for 5 minutes by using a mechanical stirrer and subject to the sol-gel reaction at the temperature of 25° C., and then matured for 12 hours at the temperature of 17° C.

After that, $TiO_2$ sediments generated through the sol-gel reaction at the temperature of 25° C. were filtered under the reduced pressure and washed three times by using the solution of distilled water (50 vol %) and ethanol (50 vol %).

Then, the $TiO_2$ sediments were vacuum-dried for 12 hours at the temperature of 35° C., and the ultrasonification was performed for 60 minutes by mixing the $TiO_2$ sediments with distilled water, thereby preparing nanoporous $TiO_2$ particles.

Embodiment 2

Nanoporous $TiO_2$ particles were prepared through the method similar to the method according to embodiment 1 except that CTAB having the carbon number of 13 in the carbon chain was used.

Embodiment 3

Nanoporous $TiO_2$ particles were prepared through the method similar to the method according to embodiment 1 except that CTAB having the carbon number of 15 in the carbon chain was used.

Embodiment 4

Nanoporous $TiO_2$ particles were prepared through the method similar to the method according to embodiment 1 except that CTAB having the carbon number of 17 in the carbon chain was used.

Comparative Example 1

P25 TiO$_2$, which has been extensively used as photocatalyst and available from Degussa Company, was prepared.

2. Evaluation of Physical Property

Figure 2:
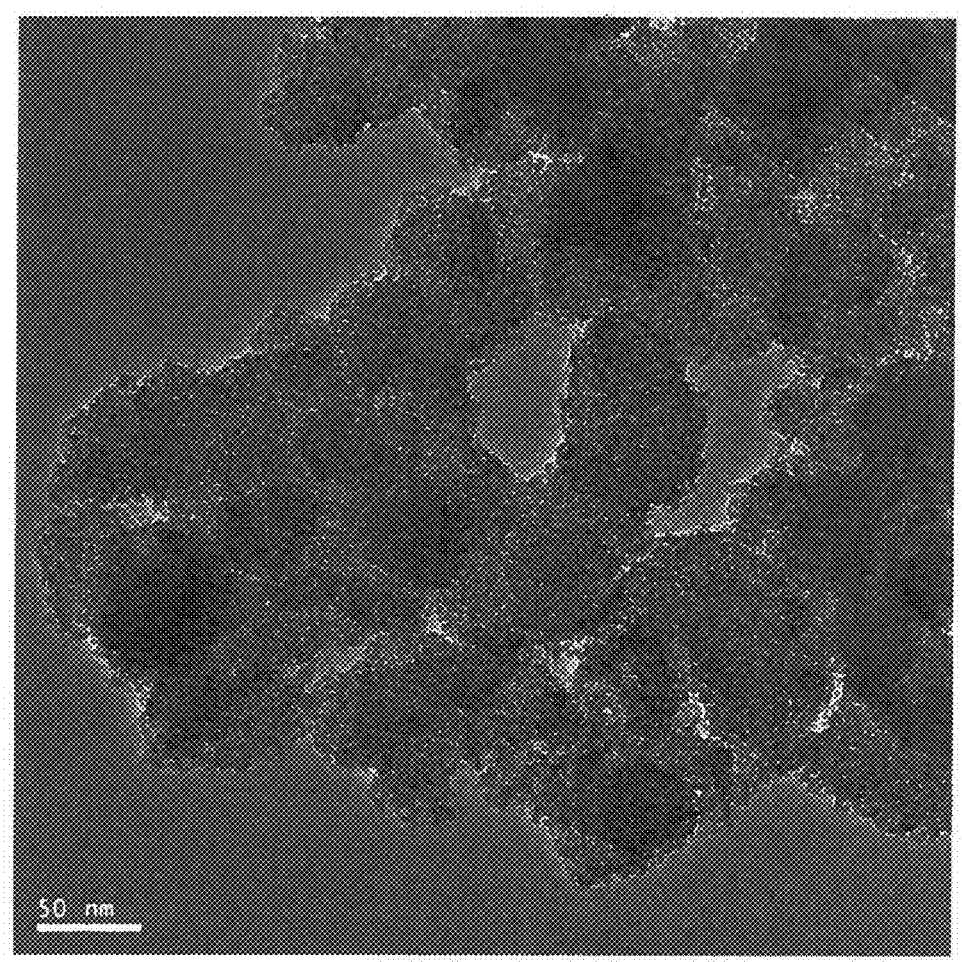
FIG. 2 is a photographic view showing a specimen prepared according to embodiment 1 of the present invention, which is photographed by a low-magnification transmission electron microscope.
Figure 3:
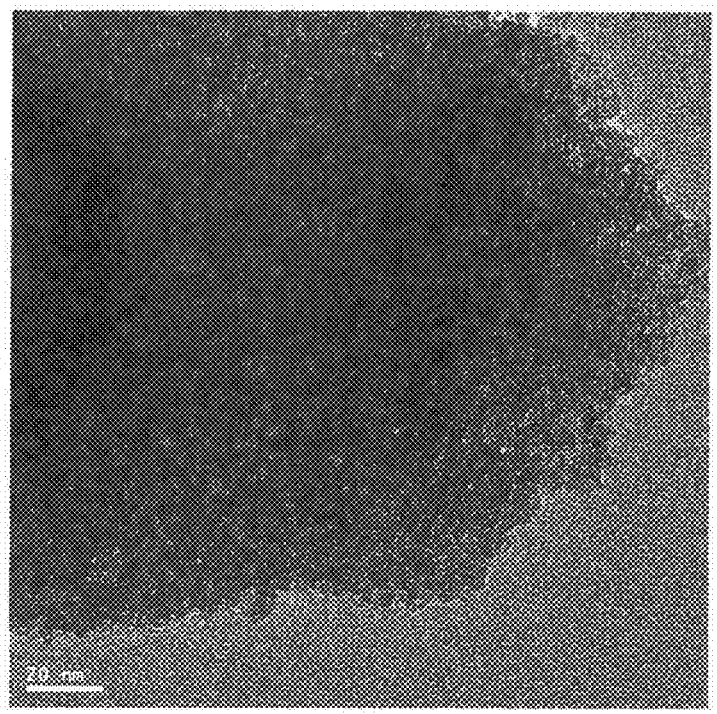
FIG. 3 is a photographic view showing a specimen prepared according to embodiment 1 of the present invention, which is photographed by a high-magnification transmission electron microscope.
Figure 3:
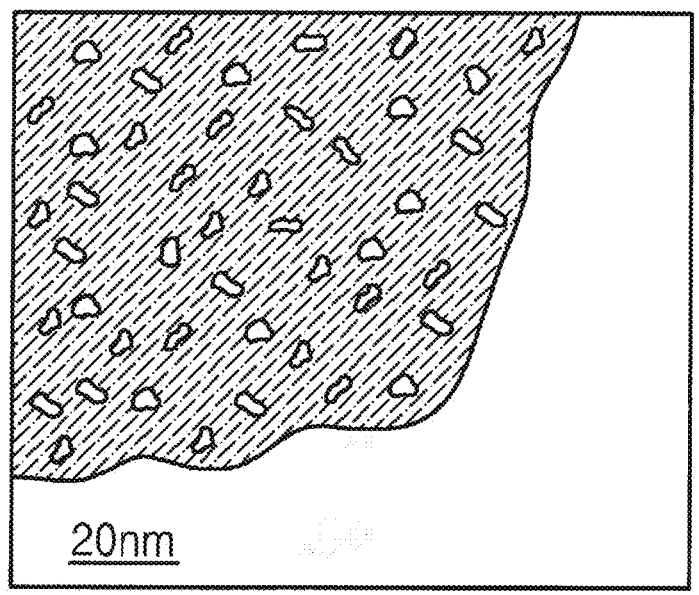

FIG. 2 is a photographic view showing a specimen prepared according to embodiment 1 of the present invention, which is photographed by a low-magnification transmission electron microscope and FIG. 3 is a photographic view showing a specimen prepared according to embodiment 1 of the present invention, which is photographed by a high-magnification transmission electron microscope.

Referring to FIGS. 2 and 3, the specimen prepared according to embodiment 1 had wormhole-like pores having a mean diameter of about 2 nm.

Figure 4:
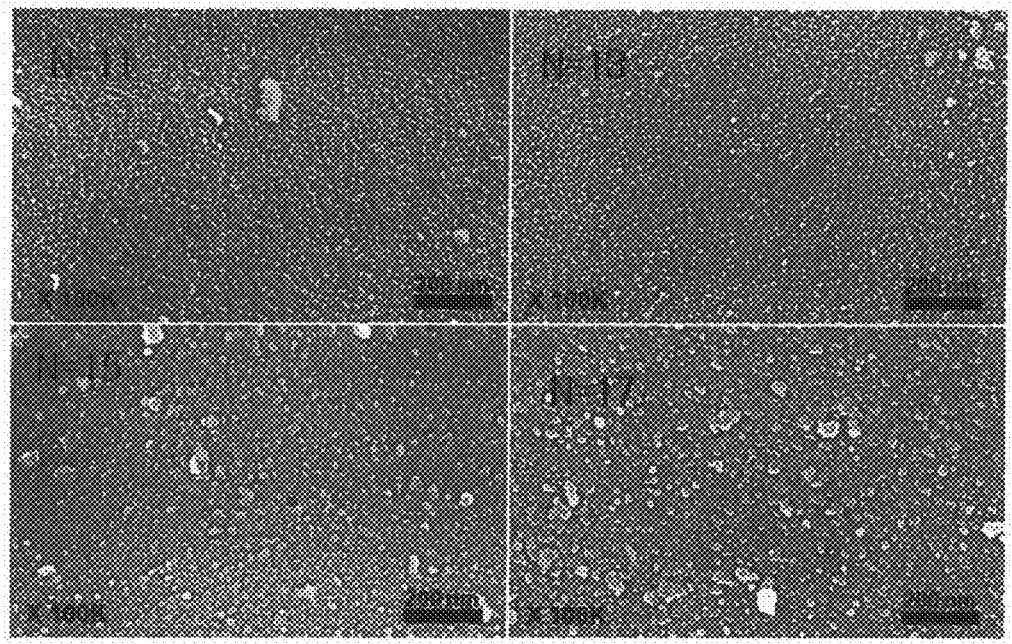
FIG. 4 is a photographic view showing specimens prepared according to the embodiments 1 to 4 of the present invention, which is photographed by a scanning electron microscope.
Figure 4:
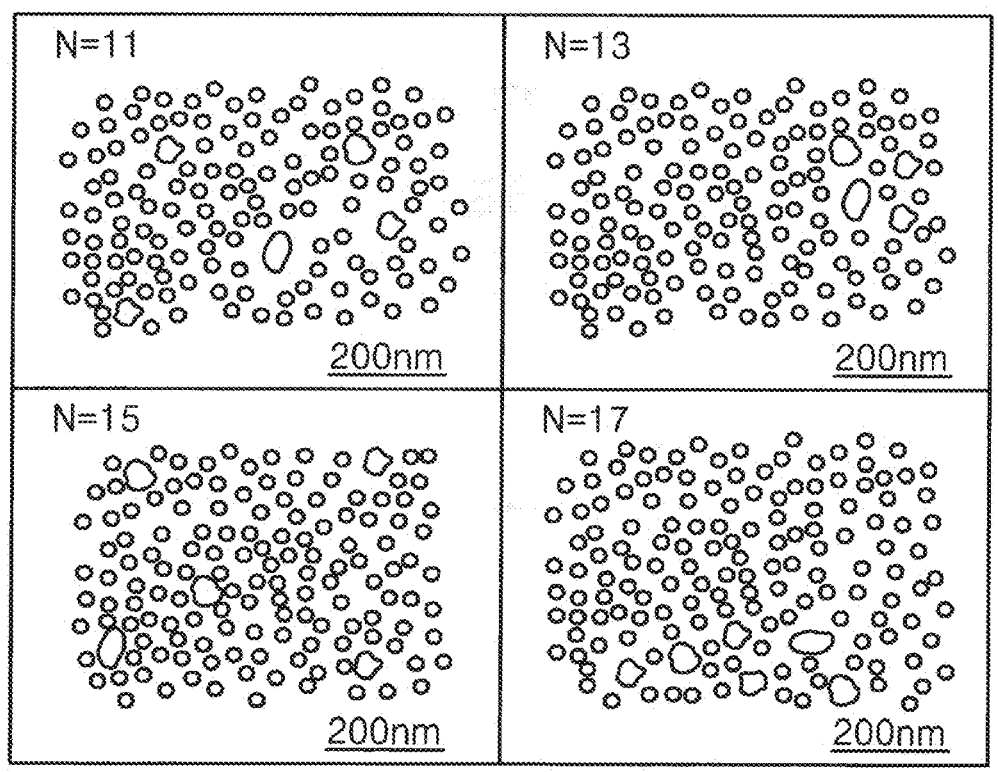

FIG. 4 is a photographic view showing specimens prepared according to embodiments 1 to 4 of the present invention, which is photographed by a scanning electron microscope.

Referring to FIG. 4, the specimens prepared according to embodiments 1 to 4 were in the form of particles having the size in the range of about few nanometers to several tens of nanometers.

Figure 5:
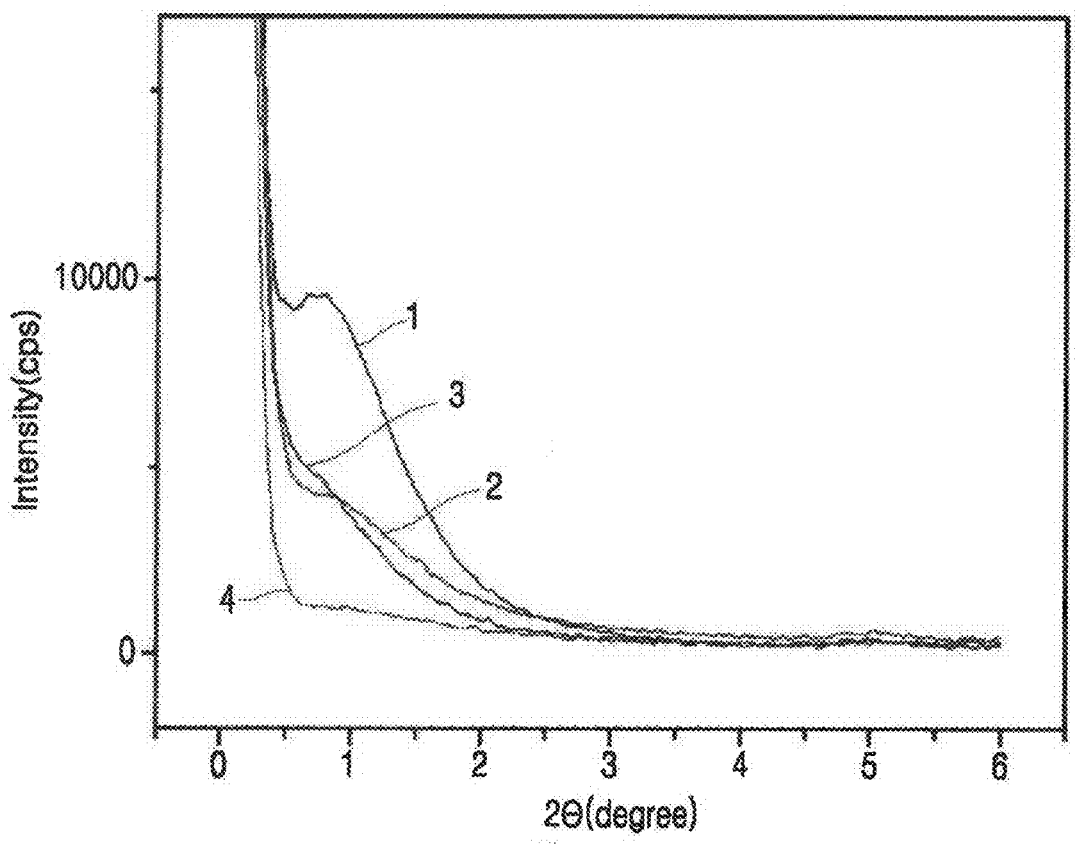
FIG. 5 is a graph showing small-angle X-ray diffraction patterns for specimens prepared according to embodiments 1 to 4 of the present invention.
Figure 6:
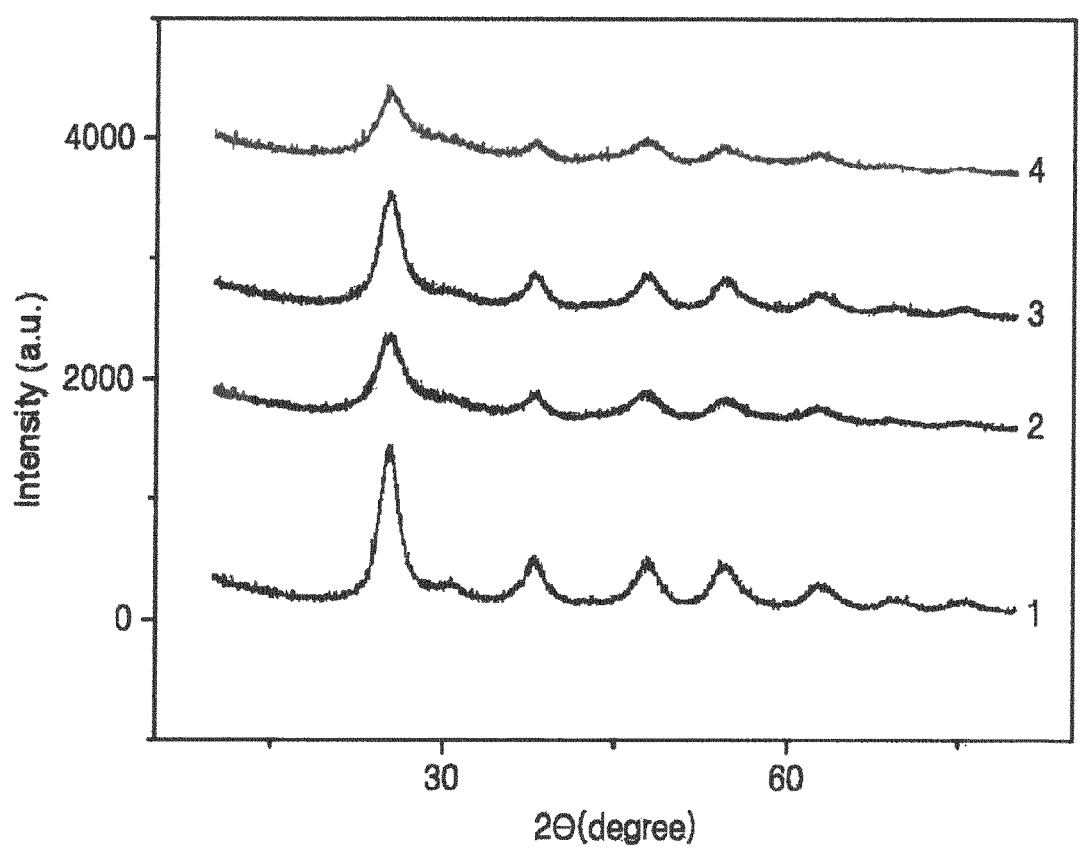
FIG. 6 is a graph showing X-ray diffraction patterns for specimens prepared according to embodiments 1 to 4 of the present invention.

FIG. 5 is a graph showing small-angle X-ray diffraction patterns for specimens prepared according to embodiments 1 to 4 of the present invention and FIG. 6 is a graph showing X-ray diffraction patterns for specimens prepared according to the embodiments 1 to 4 of the present invention.

Referring to FIG. 5, crystal peaks were represented in specimens 1, 2, 3 and 4 prepared according to embodiments 1 to 4 of the present invention. The long-range orientational ordering was not present in the specimens 1, 2, 3 and 4 prepared according to embodiments 1 to 4, but the short-range ordering was present in the specimens 1, 2, 3 and 4, so the small-angle X-ray diffraction patterns were generated.

Meanwhile, referring to FIG. 6, as can be understood from the result of the X-ray diffraction patterns, there was difference in the crystal peaks, but the superior crystallinity was represented in the specimens 1, 2, 3 and 4 prepared according to embodiments 1 to 4. All specimens had the anatase phase regardless of the carbon number in the carbon chain of the surfactant.

Figure 7:
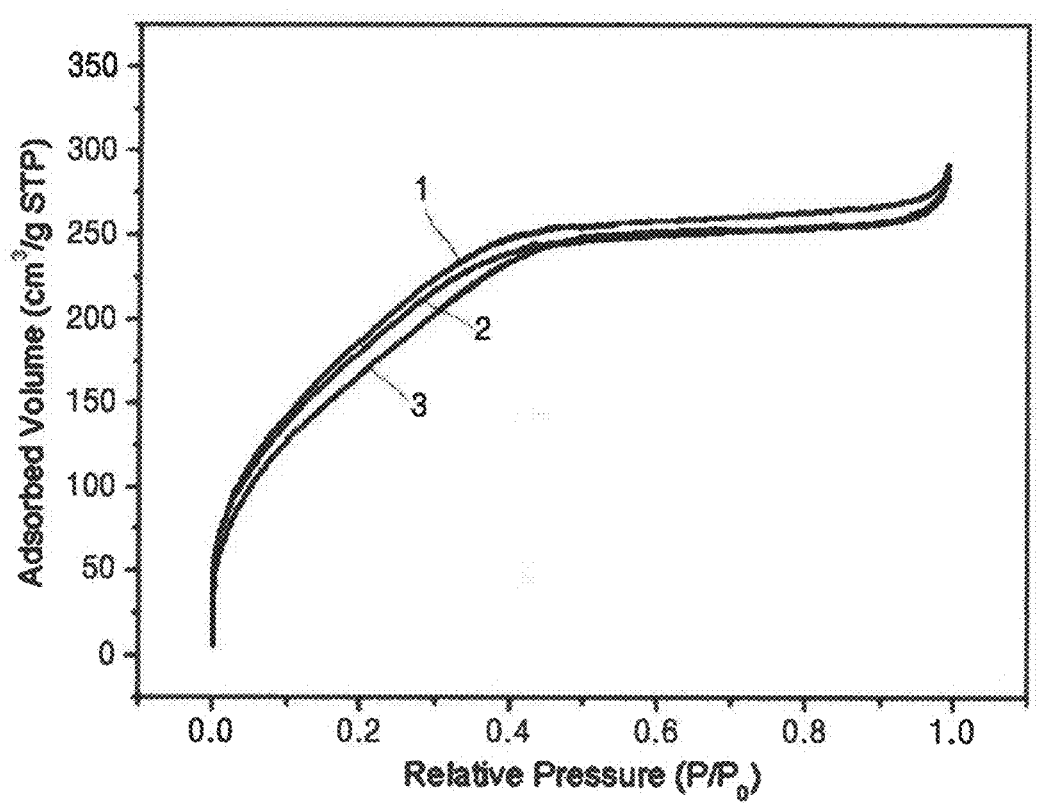
FIG. 7 is a graph showing a test result of nitrogen adsorption and desorption for specimens prepared according to embodiments 1 to 3 of the present invention.

FIG. 7 is a graph showing a test result of nitrogen adsorption and desorption for specimens prepared according to embodiments 1 to 3 of the present invention.

Referring to FIG. 7, the test result of nitrogen adsorption and desorption for the specimens 1, 2 and 3 prepared according to embodiments 1 to 3 represented the curve of the typical nanopores and the specific surface area was increased as the carbon number in the carbon chain of the surfactant was reduced.

Figure 8:
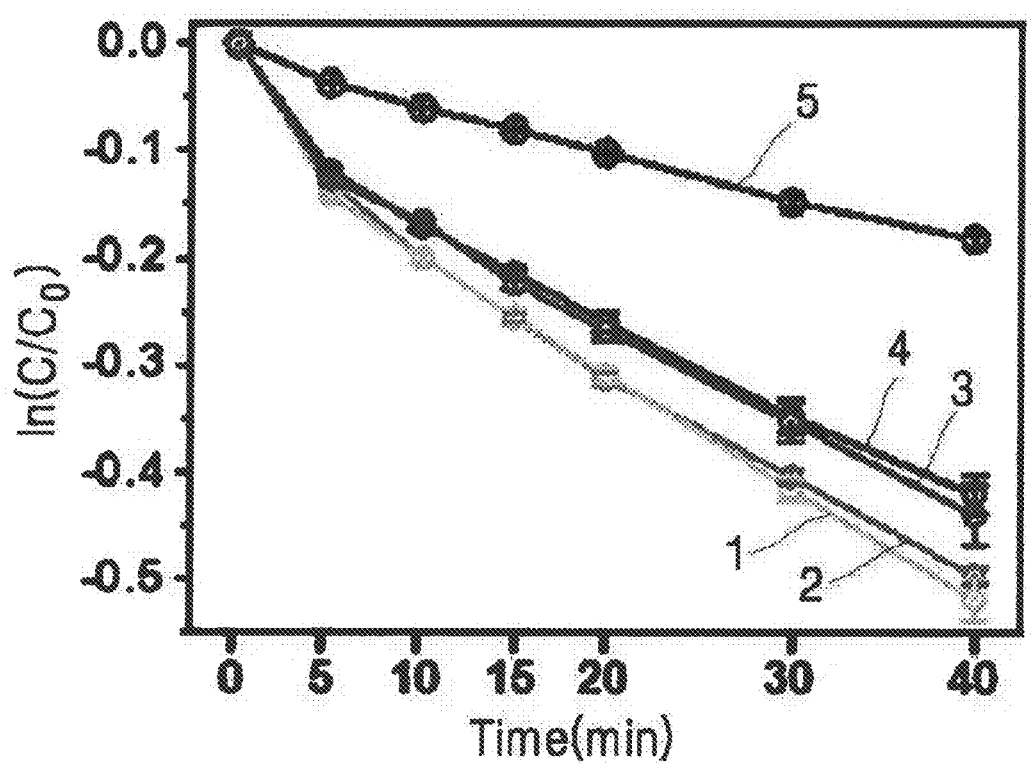
FIG. 8 is a graph showing a test result of the organic matter photolysis for specimens prepared according to embodiments 1 to 4 of the present invention and comparative example 1.

FIG. 8 is a graph showing a test result of the organic matter photolysis for specimens prepared according to embodiments 1 to 4 of the present invention and comparative example 1. The organic matter photolysis test was performed after storing the specimens prepared according to embodiments 1 to 4 and comparative example 1 in a closed test tube for 40 hours together with reactive black 5:1 mg/L and Rohdamine B 0.1 g/L.

Referring to FIG. 8, it can be understood from the test result of the organic matter photolysis that the specimens prepared according to embodiments 1 to 4 represented the superior purifying performance as compared with a specimen 5 prepared according to comparative example 1.

In detail, the specimens prepared according to embodiments 1 to 4 represented the superior purifying performance as compared with the specimen 5 prepared according to comparative example 1 because the specimens prepared according to embodiments 1 to 4 had the proper specific surface area and the superior crystallinity as compared with those of the specimen 5 prepared according to comparative example 1.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of preparing high crystalline nanoporous titanium dioxide, the method comprising:
    (a) mixing a titanium precursor and a surfactant in a solvent and performing a sol-gel reaction at a room temperature;
    (b) maturing a reactant obtained through the sol-gel reaction at the room temperature;
    (c) filtering the matured reactant and washing the matured reactant;
    (d) drying the washed reactant to obtain titanium dioxide having nanopores; and
    (e) mixing the titanium dioxide with distilled water and applying ultrasound to the mixed solution for 10 min to 40 min to give the titanium dioxide a specific surface area of 400 m$^2$/g to 600 m$^2$/g and a mean diameter of wormhole-like nanopores of 1 nm to 3 nm, the ultrasound having an energy level of 15 KHz to 30 KHz and 90 W to about 110 W.

2. The method of claim 1, wherein, in step (a), a molar ratio of the titanium precursor and the surfactant is 3:0.05 to 3:1.

3. The method of claim 1, wherein, in step (a), a molarity of the surfactant is in a range of 0.05M to 2M.

4. The method of claim 1, wherein, in step (a), the titanium precursor includes titanium n-butoxide or titanium isopropoxide.

5. The method of claim 1, wherein, in step (a), the surfactant is a cation surfactant including cetyltrimethyl ammonium bromide satisfying following chemical formula 1 or cetyltrimethyl ammonium chloride satisfying following chemical formula 2:

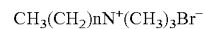  Chemical formula 1

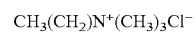  Chemical formula 2.

6. The method of claim 5, wherein, in the chemical formulas 1 and 2, the cation surfactant includes n in the range of 1 to 20.

7. The method of claim 1, wherein, in step (b), the reactant is matured for 12 hours to 30 hours.

8. The method of claim 1, wherein, in step (e), the titanium dioxide has a bicrystalline phase including anatase and brookite as the ultrasound is applied to the mixed solution.

* * * * *